United States Patent
Igawa

(10) Patent No.: US 10,451,816 B2
(45) Date of Patent: Oct. 22, 2019

(54) POLISHING SHEET EQUIPPED WITH NANO-SILICA POLISHING PARTICLES, AND POLISHING METHOD AND MANUFACTURING METHOD FOR OPTICAL FIBER CONNECTOR USING POLISHING SHEET

(71) Applicant: Mipox Corporation, Shinjuku-ku (JP)

(72) Inventor: Toshihiro Igawa, Shinjuku-ku (JP)

(73) Assignee: Mipox Corporation, Shinjuku-ku (JP)

( * ) Notice: Subject to any disclaimer, the term of this patent is extended or adjusted under 35 U.S.C. 154(b) by 0 days.

(21) Appl. No.: 15/992,295

(22) Filed: May 30, 2018

(65) Prior Publication Data

US 2018/0341068 A1 Nov. 29, 2018

Related U.S. Application Data

(63) Continuation of application No. PCT/JP2015/084398, filed on Dec. 8, 2015.

(51) Int. Cl.
*G02B 6/38* (2006.01)
*B24B 19/22* (2006.01)
*B24B 49/12* (2006.01)

(52) U.S. Cl.
CPC .......... *G02B 6/3863* (2013.01); *B24B 19/226* (2013.01); *B24B 49/12* (2013.01); *G02B 6/3885* (2013.01)

(58) Field of Classification Search
CPC ............................. G02B 6/3863; B24B 19/226
See application file for complete search history.

(56) References Cited

U.S. PATENT DOCUMENTS

| 6,106,368 A * | 8/2000 | Childers ............... B24B 19/226 451/270 |
| 6,957,920 B2 * | 10/2005 | Luther .................... G02B 6/38 385/75 |
| 6,958,082 B2 | 10/2005 | Yamazaki et al. |
| 7,267,491 B2 | 9/2007 | Luther et al. |

(Continued)

FOREIGN PATENT DOCUMENTS

| EP | 1403001 | 3/2004 |
| JP | 61156207 | 7/1986 |

(Continued)

*Primary Examiner* — Omar R Rojas
(74) *Attorney, Agent, or Firm* — Lipsitz & McAllister, LLC

(57) ABSTRACT

A polishing sheet capable of reducing recesses formed at the core of the end surface of an optical fiber, and a manufacturing method for an optical fiber connector using the polishing sheet are provided. The method includes a step of the final polishing of an optical fiber ferrule assembly in which an optical fiber protrudes from the end surface of a ferrule, the protruding optical fiber having a recess in the tip end core. During the final polishing step, the optical fiber having the recess in the core is inserted into a flocked portion of a flocked polishing sheet. The optical fiber ferrule assembly and the flocked polishing sheet are disposed opposite one another and moved relatively to each other in order to polish the optical fiber. Fibers constituting the flocked portion have silica particles with an average particle diameter from 0.01 μm to 0.1 μm adhered to the surface.

6 Claims, 6 Drawing Sheets

(56) References Cited

U.S. PATENT DOCUMENTS

| | | |
|---|---|---|
| 2003/0235374 A1 | 12/2003 | Luther et al. |
| 2004/0005460 A1 | 1/2004 | Yamazaki et al. |
| 2004/0058127 A1 | 3/2004 | Yamazaki et al. |
| 2006/0018605 A1 | 1/2006 | Luther et al. |
| 2006/0072879 A1* | 4/2006 | Yang .................... B24B 19/226 385/85 |
| 2017/0266781 A1* | 9/2017 | Taura ....................... B24D 3/00 |

FOREIGN PATENT DOCUMENTS

| | | |
|---|---|---|
| JP | 04202848 | 7/1992 |
| JP | 1082927 | 3/1998 |
| JP | 2002018690 | 1/2002 |
| JP | 2005531032 | 10/2005 |
| JP | 3924252 | 6/2007 |
| WO | 02092286 | 11/2002 |

* cited by examiner

POLISHING SHEET EQUIPPED WITH NANO-SILICA POLISHING PARTICLES, AND POLISHING METHOD AND MANUFACTURING METHOD FOR OPTICAL FIBER CONNECTOR USING POLISHING SHEET

This application is a continuation of international application number PCT/JP2015/084398 filed on Dec. 8, 2015, which is incorporated herein by reference in its entirety and for all purposes.

TECHNICAL FIELD

The present invention relates to a polishing sheet for polishing end faces of optical fibers such as multimode fibers (MM fibers) which are adhered and fixed to a connector ferrule. Specifically, the present invention relates to a polishing sheet that reduces recesses in the end faces so that the MM fibers have good optical characteristics, and relates to a method for manufacturing optical fiber connectors by using the polishing sheet.

BACKGROUND ART

A multiple optical fiber connector generally comprises a plurality of optical fibers which are aligned and adhesively fixed within the ferrule. The tips of the optical fibers protrude outwardly from the end face of the ferrule by predetermined lengths. The end faces of the ferrules of such multiple optical fiber connectors are faced toward each other so that the tips of their optical fibers are optically connected to each other.

The multiple optical fiber connectors include so-called MT (mechanically transferable) connectors, in which a pair of multi-fiber connector ferrules of pin fitting types are connected by a simple holder such as a clip, and MPO (multi-fiber push-on) connectors, which have housings with push-pull mechanisms and are coupled using a connector adaptor.

Such multiple optical fiber connectors may be manufactured as follows, for example. First, a plurality of optical fibers are aligned within a ferrule and fixed using an epoxy adhesive. The ferrule may be made of a polymer resin material (PPS resin, epoxy resin, etc.) containing a silica filler or a ceramic material (such as zirconia). Then, the epoxy adhesive covering the fibers is removed from the end face of the ferrule, and the end face of the ferrule is polished into a flat surface (flat surface polishing process). Subsequently, the end face of the ferrule is preferentially polished so that the fibers made of quartz-based glass protrude from the end face of the ferrule by a predetermined amount (protruding process). Then, after scratches and flaws are removed (removing process), the end face of the optical fiber is polished into a mirror face (finishing process).

The fiber end face subjected to a plurality of polishing steps as described above generally has a recess (core dip) in the core portion. The optical fiber consists of a core portion made of quartz glass doped with germanium ($GeO_2$) or the like and a clad portion made of quartz glass. Since the core portion has a lower hardness than the clad portion, the core dip tends to become large through a plurality of polishing steps. In the finishing step for the end face of the quartz glass fiber, generally, a grinding stone or a polishing sheet containing cerium oxide ($CeO_2$) abrasive grain is used to remove a work-affected layer and scratches. The core dip tends to become deeper and larger due to the mechanochemical action of $CeO_2$.

The core dips of the fiber end faces affect connection loss, especially return loss in optical connection between multiple optical fiber connectors. The MM fiber may have a core diameter of 50 μm or 62.5 μm with respect to a clad diameter of about 125 μm. Since the core diameter is larger than that of the single mode fiber (SM fiber) (the core diameter is about 9 μm to the clad diameter of 125 μm), the core dip tends to become large and have significant influence.

Conventionally, an optical fiber having a core material consisting of a material harder than the clad material has been proposed for an MPO connector. This makes it possible, when polishing the optical fiber end face so that it protrudes from the ferrule end face for PC (physical contact) connection, to prevent formation of recesses in the cores, thereby preventing formation of a gap between the cores and improving coupling rate (JP-A-H10-82927: patent document 1).

Furthermore, a method of polishing connection end surfaces of multiple optical fiber connector ferrules (including end faces of optical fibers or protruding end faces) has been proposed for the multiple optical fiber connectors so that the optical fibers sufficiently protrude from the end face of ferrules while preventing formation of recesses in the fiber cores. The method comprises first, second and third polishing processes. In the first polishing process, adhesives adhered to the end surfaces are removed, and the end surfaces are made flat. In the second polishing process, the optical fibers are made to project relative to the connection end surface of the ferrule by constant amounts through polishing of the connection end surface using a satin polishing sheet. In the third polishing process, the projection dimension is changed to a predetermined projection dimension through polishing of protruding end faces of the optical fibers (JP-A-2002-18690: patent document 2).

A method for providing a plurality of optical fibers extending at least about 3.5 μm beyond the front face of the ferrule has been proposed, wherein the end portions of the optical fibers are substantially coplanar so as to establish direct physical contact between the optical fibers of multi-fiber connectors. In the method, the end portions of the optical fibers generally remain extended beyond the front face of the ferrule during the entire process, thereby obviating the need to grind or polish the end portions of the optical fibers flush with the front face of the ferrule prior to preferentially etching the front face of the ferrule relative to the end portions of the optical fibers. As a result of the relatively small size of the abrasive particles utilized, the end portions of the optical fibers may not have significant core dip (JP-A-2005-531032: patent document 3).

CITATION LIST

Patent Document

Patent Document 1: JP-A-H10-82927
Patent Document 2: JP-A-2002-18690
Patent Document 3: JP-A-2005-531032

SUMMARY OF INVENTION

Problems to be Solved by the Invention

The conventionally proposed method for reducing recesses in the fiber end faces, whereby optical fiber made of material different from the conventional material should be inserted and fixed into the ferrule so as to be joined and fixed to the conventional optical fiber, is complicated. The recesses of the fiber end faces cannot be sufficiently reduced simply by controlling projection dimensions. There was also the problem that the projection dimensions or polishing processes had to be changed, which can cause the number of steps for manufacturing the multiple optical fiber connector to be increased.

In view of the above problems, the object of the present invention is to provide a polishing sheet capable of manufacturing multiple optical fiber connectors having excellent optical characteristics by sufficiently reducing core dips without increasing the number of polishing steps as compared with prior arts. It is the object of the present invention to provide a method for polishing of connector ferrules having a plurality of optical fibers using the polishing sheet, and a method of manufacturing multiple optical fiber connectors.

Solution to the Problem

Provided herein in one embodiment of the present invention is a method of manufacturing an optical fiber connector comprising optical fibers attached to a ferrule. The method comprises a finish polishing of an optical fiber ferrule assembly, wherein optical fibers protrude from an end face of the ferrule by polishing, the protruding optical fibers having recesses in their tip cores, the recesses being formed by the polishing. The finish polishing is performed by moving the optical fiber ferrule assembly and a flocked polishing sheet relative to each other while the optical fiber ferrule assembly is arranged to be opposed to the flocked polishing sheet, with the optical fibers being inserted into the flocked portion of the flocked polishing sheet, the optical fibers having recesses at their cores. In the polishing, in order to reduce the depths of the recesses, silica particles having an average particle diameter in the range of 0.01 μm to 0.1 μm are attached to the surfaces of the fibers constituting the flocked portion.

According to the present invention, the finish polishing of the end face of the optical fibers is performed using a polishing sheet provided with superfine silica polishing particles having particle sizes in the nano order level. Due to the proper mechanical polishing action of nanosilica polishing particles attached to the flocked portion of the flocked sheet, the recesses at the fiber cores formed in a previous step are significantly reduced to approximately several to ten nanometers while finishing the fiber end faces to mirror surfaces.

The recesses of the cores are generally formed by a first polishing for polishing the optical fiber ferrule assembly having a flat end face so that the optical fibers protrude, and by a second polishing for polishing the protruding optical fibers. The depths of the recesses are reduced in a finish polishing as compared with that after the first or second polishing.

According to the present invention, even if the recesses of the core portions are increased in the first polishing or the second polishing, the recesses are eventually sufficiently reduced in the finishing process. The projecting height is controlled through the process. An optical fiber connector having more excellent optical characteristics can be obtained without increasing the number of polishing processes.

In the second polishing, the optical fiber formed by the first polishing is polished using a polishing material with aluminum oxide particles having an average particle diameter of 1 μm. By using an appropriate polishing material, surface properties suitable for the finish polishing can be obtained in the previous process, the finish polishing being performed using nanosilica polishing particles according to the present invention.

The optical fiber connector may be a multiple multi-mode fiber connector with a plurality of multi-mode fibers attached to the ferrule.

The depth of the recess of the core at the tip of the optical fiber may be 20 nm or less, the recess being formed by the finish polishing according to the present invention.

Another embodiment of the present invention provides a polishing method for polishing an optical fiber ferrule assembly so that the depths of the recesses at the cores are reduced, the optical fiber ferrule assembly having optical fibers made to protrude from the end face of the ferrule by a polishing, the protruding optical fibers having recesses formed by the polishing at their tip cores. In the method, the optical fiber ferrule assembly is arranged to be opposed to a flocked polishing sheet. The optical fibers having core recesses are inserted into a flocked portion of the flocked polishing sheet. The optical fiber ferrule assembly and the flocked polishing sheet are moved relative to each other. The fibers constituting the flocked portion have silica particles having an average particle diameter of 0.01 μm to 0.1 μm attached to the surface thereof.

Still another embodiment of the present invention provides a polishing sheet for a finish polishing capable of reducing depths of recesses at tip cores of optical fibers included in an optical fiber ferrule assembly, wherein the optical fibers have protruded from an end face of a ferrule by a polishing, the protruding optical fibers having recesses formed by the polishing at their tip cores, and comprises a flocked portion comprising a plurality of fibers flocked on a base sheet, the surfaces of the fibers having polishing particles which comprise silica particles having an average particle diameter of 0.01 μm to 0.1 μm so that selective polishing in the cores of the optical fibers is prevented when moving the polishing sheet and the optical fiber ferrule assembly relative to each other while the optical fibers having core recesses are inserted into the flocked portion.

Effects of the Invention

By means of the polishing sheet of the present invention, the core dip can be reduced while the end faces of the optical fibers are mirror finished in the finishing process. By means of the present invention, it is possible to easily manufacture MM fiber connectors having optical characteristics superior to conventional ones by using a conventional polishing apparatus or the like without requiring any special process.

BEST MODES FOR CARRYING OUT THE INVENTION

Figure 1:
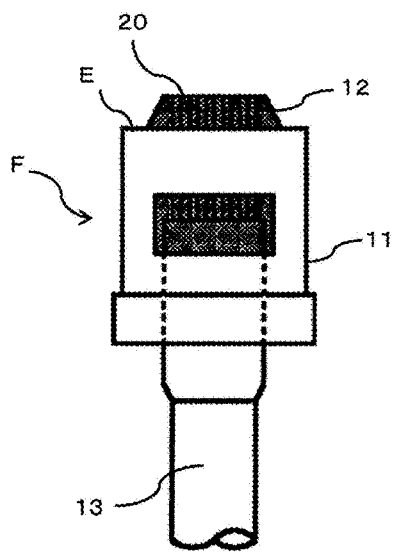
FIG. 1(a) and FIG. 1(b) schematically show respective optical fiber ferrule assemblies before and after removing the epoxy adhesive.
Figure 1:
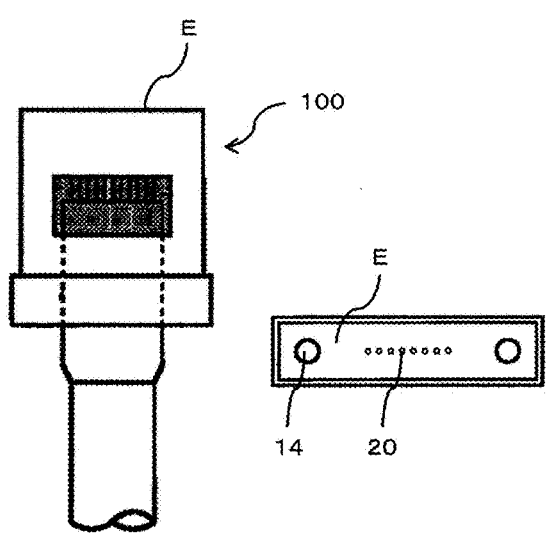

Hereinafter, preferred embodiments of the present invention will be described with reference to the drawings. The drawings are for explanation, and the dimensions therein, such as thickness, may be exaggerated. The scale of the drawings may vary. The same symbol may be used for a similar or corresponding component. The configurations described in the drawings are given by way of example and are not intended to limit the scope of the invention.

Figure 3:
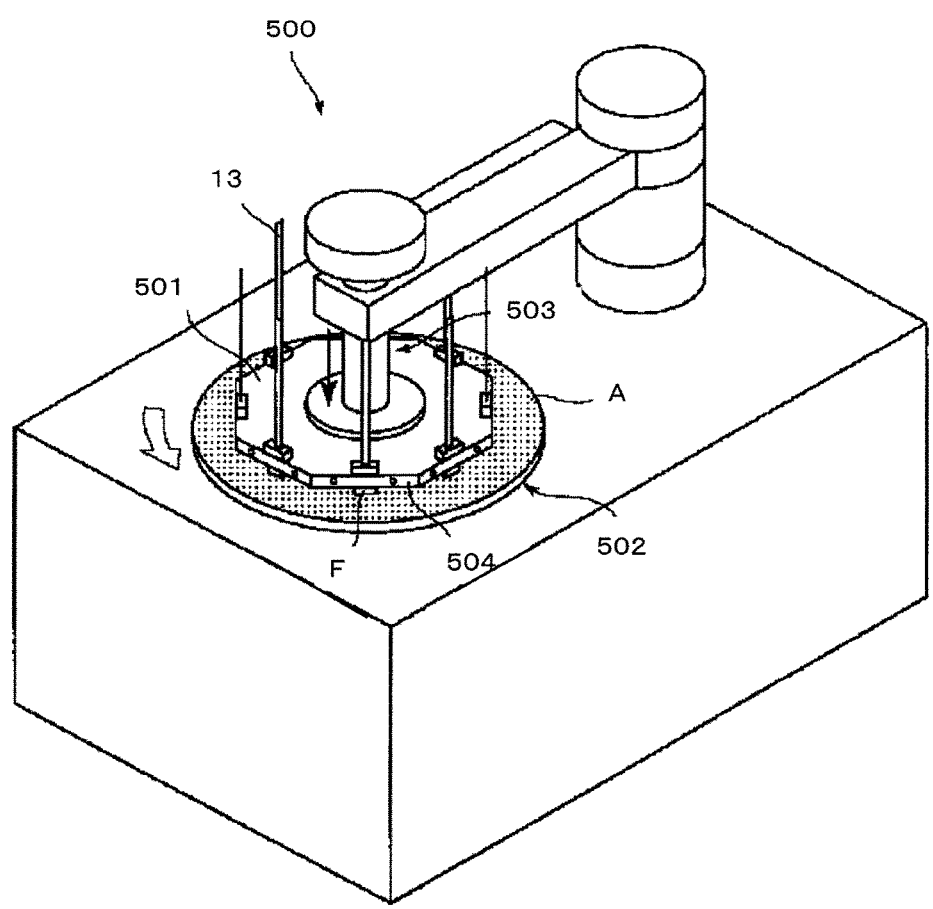
FIG. 3 shows a polishing apparatus of an embodiment used in the polishing method of the present invention.

FIG. 3 is a perspective view showing a known polishing apparatus 500 used for polishing the end faces of ferrules of PC-connectable optical fiber connectors. The polishing apparatus 500 includes a ferrule holding plate 501 on which a plurality of optical fiber ferrule assemblies Fs and the like can be mounted, a disc-shaped polishing platen 502 arranged to oppose the ferrule holding plate 501, and a pressure mechanism 503 for pressing the ferrule holding plate 501 against the polishing platen 502 with a predetermined pressing force. For example, the ferrule holding plate 501 is formed substantially like a regular octagon. On the outer periphery of the plate, a plurality of ferrule fitting grooves to which the optical fiber ferrule assemblies Fs can be fitted are formed at a predetermined angular interval. The optical fiber ferrule assembly F is fitted into the ferrule fitting groove before it is fixed to the ferrule holding plate 501 using the fixing plate 504. The optical fiber ferrule assembly has different fiber projecting lengths and shapes of fiber end faces in each of the polishing stages.

On the surface of the polishing platen 502, a polishing sheet A appropriately selected according to the polishing stage is arranged via a polishing pad such as a glass pad. During the polishing process, the polishing platen 502 is rotationally driven, for example, in a direction indicated by the outline arrow in FIG. 3, by a rotary drive mechanism (not shown) and is revolved with a predetermined locus with respect to the ferrule holding plate 501 by a relative moving mechanism (not shown). Using such polishing apparatus 500, each of the ferrule end faces and the end faces of the optical fibers projecting from respective ferrule end faces are polished by rotating and revolving the polishing platen 502 with the pressure mechanism 503 which presses the end faces of the respective optical fiber ferrule assemblies Fs against the polishing sheet A on the polishing platen 502.

Regarding the stages of polishing, initially, a flat surface polishing process is performed. FIG. 1 (a) shows an optical fiber ferrule assembly F which is to be polished in the flat surface polishing. In the optical fiber ferrule assembly F, the optical fibers 20s of the optical fiber tape 13 inserted into the ferrule 11 are fixed to the ferrule 11 by an epoxy adhesive 12. The epoxy adhesive 12 overflows to the end face E of the ferrule and substantially covers a plurality of (for example, eight) optical fibers 20s. The flat surface polishing process is performed so as to remove the epoxy adhesive 12 and the optical fibers 20s, both of which protrude from the end face E. As shown in FIG. 1 (b), an optical fiber ferrule assembly 100 having an end face E is formed after the flat surface polishing process. The end face E is substantially flat. The projecting height of the fiber 20 is about 0 nm to several hundred nm. The end face E may have a pair of pin holes 14s for pin fitting the MT connector.

An abrasive which contains abrasive particles of relatively large particle size can be used for the flat surface polishing process. Such abrasive may include a polishing sheet which contains abrasive particles having an average particle size of about 10 to 30 μm, the abrasive particles being fixed to a base sheet using a binder resin. Examples of abrasive particles include silicon carbide, diamond, and aluminum oxide. For example, a flat surface polishing process may be performed using a polishing sheet having silicon carbide (SC) particles having an average particle diameter of 16 μm fixed on the base sheet with a binder resin.

Figure 2:
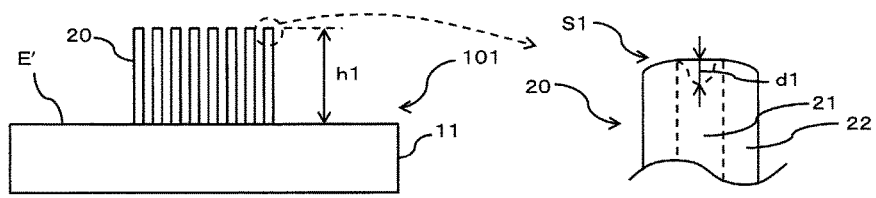
FIGS. 2(a), (b), (c) and (d) schematically illustrate parts of the optical fiber ferrule assemblies and the side views of the enlarged fiber ends after each polishing process.
Figure 2:
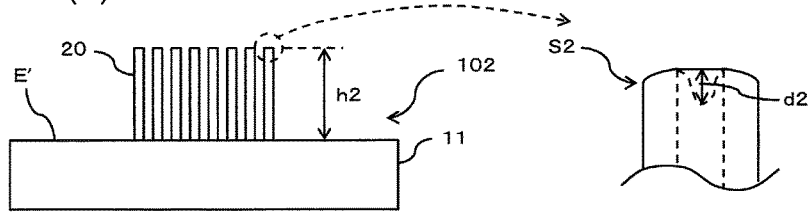
Figure 2:
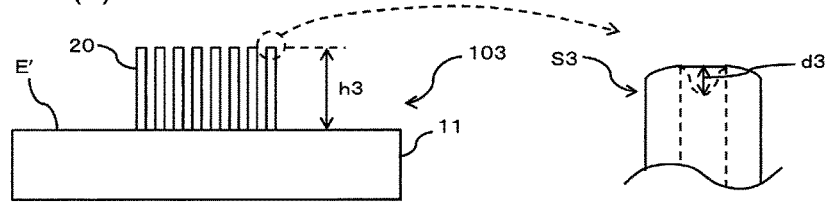
Figure 2:
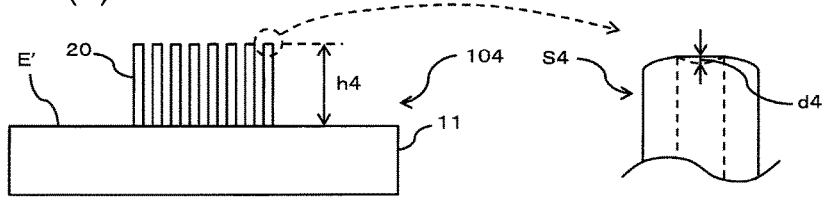

After the flat surface polishing, a protruding process for protruding the optical fibers to predetermined heights from the end face of the ferrule is performed. FIG. 2 (a) schematically shows a part of optical fiber ferrule assembly 101 formed by the protruding process. When the end face E (FIG. 1) of the optical fiber ferrule assembly 100 is abutted on a given polishing sheet to be polished, the sheet being disposed on the polishing platen 502 of the polishing apparatus 500, the polishing amount of the ferrule 11 becomes larger than the polishing amount of the optical fiber 20, since the ferrule 11 is made of a soft material such as resin and each optical fiber 20 is made of a hard material such as quartz glass. Therefore, the optical fiber ferrule assembly 101 has fibers 20s protruding from the ferrule end face E' formed by polishing. Each optical fiber 20 has a projecting height h1 (1000 nm<h1≤3000 nm) which is suitable for PC connection.

Examples of an abrasive for the protruding process may include a polishing sheet or a flocked polishing sheet which contains polishing particles having an average particle size of about 2 to 9 μm, the polishing particles being adhered to a base sheet or a plurality of fibers flocked on a base sheet with a binder resin. Examples of polishing particles include silicon carbide, diamond, aluminum oxide, and the like. For example, a protruding process may be performed using a polishing sheet which contains silicon carbide (SC) particles having an average particle size of about 3 μm, the particles being fixed on a base sheet with a binder resin.

FIG. 2 on the right shows an enlarged side view of the end S1 of the fiber 20. The central portion indicated by a broken line is a core 21 inside the fiber, and the outer peripheral portion is a clad 22. After polishing, the fiber 20 has a reduced projecting height and a recess in the core portion, the recess being dented by a depth d1 (indicated by a broken line). The depth of the recess of the core portion (core dip) may be defined, using as a reference height the ridgeline of the core recess, as the length of the straight line which is drawn vertically from a reference line (a reference plane) passing through the ridgeline to the deepest portion of the core recess. It should be noted that the actual recess is minute (the depth is about several tens to hundreds nm), however, the figure is exaggerated for explanation. Generally, the core 21 of the optical fiber 20 is made of quartz glass ($SiO_2$) doped with germanium ($GeO_2$), and the clad 22 is made of quartz glass ($SiO_2$), and therefore, the clad 22 is higher in hardness than the core 21. When polishing is performed for protruding, the polishing amount of the core 21 is larger than that of the clad 22, and the recess is formed.

Following the protruding process, a process for removing flaws is performed. FIG. 2 (b) shows the optical fiber ferrule assembly 102 formed by the process for removing flaws. The optical fiber ferrule assembly 102 has the optical fiber 20 protruding from a ferrule end face E' by a height h2 (1000 nm<h2<3000 nm) which is slightly lower than h1. The height h2 is formed by polishing the end face of the ferrule together with the fiber; however, in the process for removing flaws or the like performed after the protruding process, the polishing amount of the ferrule end face may be reduced. Flaws such as minute scratches may be reduced at the end portion S2 of the optical fiber formed by the process of removing flaws; however, the core portion has a recess with a depth d2 (>d1).

A polishing material for the process of removing flaws may include a (flocked) polishing sheet containing polishing particles having an average particle size of about 1 to 3 μm, the particles being fixed on a base sheet with a binder resin. Examples of polishing particles include silicon carbide, diamond, aluminum oxide, and the like. For example, a polishing sheet prepared by fixing aluminum oxide (AA) particles on a base sheet with a binder resin can be used for polishing after the protruding process and before the finish polishing process, the aluminum oxide (AA) particles having an average particle diameter of about 1 μm.

Following the above removing process, the finish polishing process for polishing the fiber end face S2 into a mirror surface is performed.

Cerium oxide (CeO2) has been used for a polishing of glass for a long time. As it became more important to polish glass made of SiO2, researches on polishing particles to achieve desired polishing were actively conducted. As a result, it is considered that chemical action takes place between CeO2 abrasive grains and the glass, and that CeO2 abrasive grains directly react with SiO2 which is a polishing object, thereby achieving a higher polishing rate than in polishing performed using other polishing materials such as SiO2.

Thus, cerium oxide (CeO2) (flocked) polishing film and the like have been conventionally used for the finish polishing process of fibers in manufacturing MT connectors, MPO connectors and the like. Polishing by using loose abrasives may achieve mechanochemical polishing with various oxide slurries; however, the postprocess for treating slurry increases. Therefore, for the most part, cerium oxide fixed abrasive grains have been used.

However, when cerium fixed abrasive grains are used, selective polishing in a multi-mode fiber core is predominantly performed due to the chemical polishing action, and as a result, there is a problem that the concave shape of the end face of the fiber, namely, the core dip, increases. The core dip greatly relates to the optical characteristics of the product. The larger the core dip, the more the communication or optical characteristics are impaired.

In order to reduce the core dip of the quartz glass fiber, the inventor uses SiO2 as the fixed polishing particles so that the physical polishing action can be utilized. The inventor has found that, when polishing is performed by using SiO2 fine abrasive grains fixed to flocked fibers, selective and excessive polishing in the fiber core can be prevented while achieving a sufficient polishing rate and polishing accuracy.

Figure 4A:
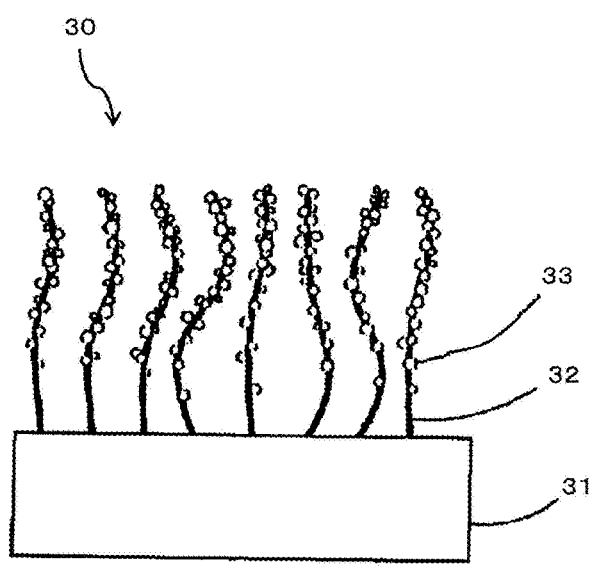
FIG. 4A schematically shows a polishing sheet for a finish polishing according to the present invention.

FIG. 4A schematically illustrates the polishing sheet 30 used for the finish polishing according to the present invention. The polishing sheet 30 comprises a base sheet 31 and nanosilica polishing particles 33 fixed to the surfaces of a plurality of fibers 32 with a binder resin, the fibers being flocked on the base sheet.

The variety of silica may include dry synthetic silica, wet synthetic silica, synthetic crystalline silica, natural crystalline silica and natural amorphous silica. Colloidal silica obtained by wet synthetic sol-gel method is preferably used.

The average particle diameter of the silica polishing particles 33 is preferably in the range of 0.01 μm to 0.1 μm. If the average particle diameter is less than 0.01 μm, the polishing rate will be too low. An average particle diameter exceeding 0.1 μm is not preferable because the desired mirror finish cannot be achieved and because the effect of reducing the recess becomes insufficient. More preferably, the average particle diameter of the silica polishing particles is in the range of 0.01 μm to 0.02 μm. By performing finish polishing using a flocked polishing sheet provided with such nanosilica polishing particles, an MM fiber can be obtained in which the depth of the recess at the fiber end face is substantially reduced as compared with that in the previous process and which has excellent optical characteristics.

The nanosilica flocked polishing sheet according to the present invention can be prepared by coating a flocked sheet with a coating which can be obtained by mixing and stirring nanosilica polishing particles, a binder resin, etc., and adjusting the viscosity thereof.

The flocked sheet to be coated with the coating can be prepared by disposing a base sheet coated with an adhesive on the surface and short fibers in an electric field and by adhering the electrostatically charged short fibers to the surface of the base sheet. Since the short fibers are charged to the same polarity, the short fibers can be flocked on the base sheet without adhering to each other.

The coating is prepared by mixing nanosilica dispersion liquid with a binder resin and a curing agent so that the weight ratio within the coating after drying is within a predetermined range, and stirring and filtering them. And then, the viscosity can be adjusted to 300 cp or less with a mixed solvent of toluene, xylene, ethyl acetate, and MEK. When the viscosity exceeds 300 cp, the fluidity deteriorates with increase in viscosity, and silica particles cannot spread to the inside of the flocked layer, which is not preferable. The viscosity of the coating may be adjusted to 1 to 300 cp, preferably 1 to 150 cp and more preferably 2 to 20 cp. Thus, the silica particles are distributed to the inside of the flocked portion, and the nanosilica polishing particles can be effectively applied to the optical fibers inserted into the flocked portion.

A woven fabric, a nonwoven fabric, or a plastic film sheet can be used as the base sheet for the flocked sheet. Preferably, a plastic film sheet is used as the base sheet for the flocked sheet. Examples of a plastic film sheet include PET (polyethylene terephthalate), PEN (polyethylene naphthalate), PPS (polyphenylene sulfide), PEI (polyether imide), PI (polyimide), PI (polycarbonate), PVC (polyvinyl chloride), PP (polypropylene), PVDC (polyvinylidene chloride), nylon, PE (polyethylene), or PES (polyether sulfone) film sheet.

The flock may consist of nylon, polypropylene, polyethylene, polyethylene terephthalate, polyurethane, acrylic, polyvinyl chloride, vinylon or rayon fiber, glass fiber, carbon fiber or metal fiber. Preferably, the thickness of the flock is in the range of 0.1 to 10 d, and its length is in the range of 0.1 to 1.0 mm, because if the fibers are too thick or too short, they lack elasticity, and because if the fibers are too fine or too long, the fibers are twisted together and polishing particles cannot be attached to each of the fibers one by one.

The binder may be polyester resin, polyurethane resin, vinyl copolymerized resin, epoxy resin, phenol resin, a mixture thereof reacting with a curing agent, or water soluble resin.

Polishing is performed by placing the nanosilica flocked sheet according to the present invention on the polishing platen 502 of the polishing apparatus 500 and bringing it in contact with the end face of the fiber ferrule assembly while moving the sheet and the end face relative to each other. It is perceived that the end portion of each optical fiber enters the inside or near the root part of the flocked portion so that the fiber can be successively polished from its side surface and there is no chemical action like cerium oxide, thereby suppressing the selective polishing of the core.

Referring to FIG. 2 (c), the end S3 of each fiber 20 of the optical fiber assembly 103 has a core dip with a reduced depth d3 on average as compared to d2, the end S3 being formed by a finish polishing (a first finishing process) using the polishing sheet 30. Each optical fiber 20 has a projecting height h3 (1000 nm<h3<3000 nm) which is slightly lower than h2.

Further, a finishing process (a second finishing process) is performed to finally form the end S4 of each optical fiber 20 of the optical fiber ferrule assembly 104 (the optical fiber connector). The depth of the core dip at the end S4 can be reduced to a depth d4 of approximately several to ten oddnanometers. The projecting height h4 (1000 nm<h4<3000 nm) of the fiber is lower than h3. Each of the projecting heights h1, h2, h3, and h4 is in the range of 1000 to 3000 nm, and is set to a projecting height suitable for connection through the polishing processes.

Polishing tests were performed on a multiple MM fiber ferrule assembly in which twelve 50 μm MM fibers were attached to the ferrule by using the polishing films of the comparative example and the example. The conditions of each polishing process are as shown in Table 1 below.

TABLE 1

| Process | Polishing sheet | Rotational speed (rpm) | Pressing force (lb) | Polishing time (sec) |
|---|---|---|---|---|
| Removing epoxy | SC sheet | 120 | 4 | 45 |
| Polishing for protruding | SC sheet | 80 | 6 | 120 |
| Removing flaws | AA sheet | 120 | 9 | 120 |
| Finish polishing (first) | CeO2 flocked sheet or nanosilica flocked sheet | 100 | 8 | 120 |
| Finish polishing (second) | CeO2 flocked sheet or nanosilica flocked sheet | 100 | 8 | 120 |

Polishing apparatus: Optical fiber polishing apparatus (HDC-5200: manufactured by Domaille)
Water for polishing: distilled water
Polishing pad: glass pad

COMPARATIVE EXAMPLE

As the polishing sheet of the comparative example, a cerium oxide-flocked sheet was used for the finish polishing processes 1 and 2. The cerium oxide-flocked sheet of the comparative example was prepared by attaching cerium oxide particles having an average particle diameter of 1 μm to nylon pile (thickness: 1 d, length: 0.4 mm) flocked on a PET base material with a binder made of polyester resin formulated with isocyanate curing agent.

EXAMPLE

The flocked polishing sheet for a finish polishing of the example was prepared by coating nylon pile (thickness: 1 d, length: 0.4 mm) adhered to the surface of a PET base material with a coating. The coating was prepared as follows. Colloidal silica dispersion (silica particle diameter: 10 to 20 nm) having a solid content weight of 40%, a bisphenol A epoxy resin and a phenol-based curing agent are mixed so that the weight ratio within the coating after drying is 60 to 98% of silica, 1 to 30% of epoxy resin and 1 to 10% of phenol-based curing agent, before being stirred and filtered. And then, viscosity is adjusted to 4 cp with a mixed solvent of toluene, xylene, ethyl acetate, and MEK. The coating was coated on flocked fibers using a gravure roller.

Figure 4B:
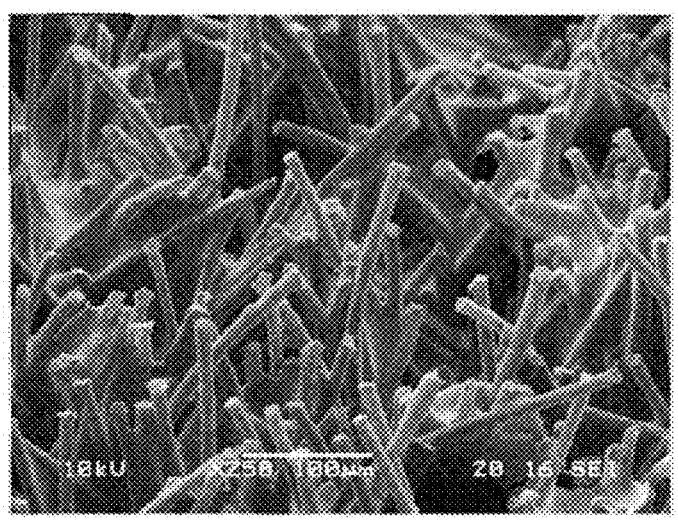
FIG. 4B is an enlarged photograph of the polishing sheet according to the present invention, observed by a scanning electron microscope (SEM).

FIG. 4B shows a photograph, taken by a scanning electron microscope (JSM 5510: manufactured by JEOL) and enlarged to 250 times, of the prepared polishing sheet. It can be seen that the nanosilica polishing particles have spread to the interior of the flocked portion and attached to the fiber surface.

Figure 5:
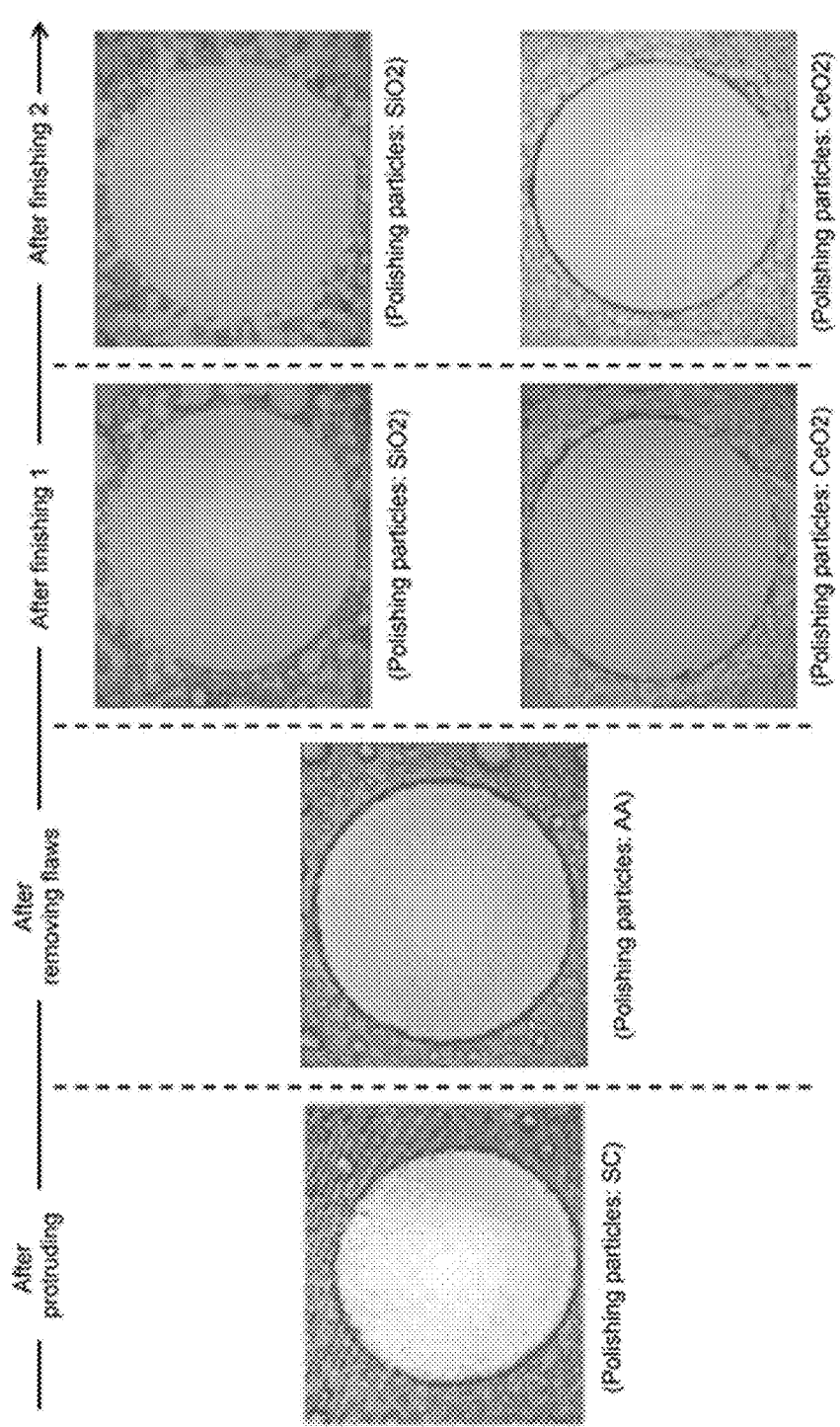
FIG. 5 shows enlarged photographs of the fiber end faces after each of the polishing processes, observed by an optical microscope.

FIG. 5 shows an enlarged photograph of the end face of the MM fibers after each polishing process, the photograph being taken by an end view observer (Westover FV 400: manufactured by JDSU). It can be seen that smoother end faces were formed by using the SiO2 flocked sheet of the example compared with the CeO2 flocked sheet of the comparative example.

Figure 6:
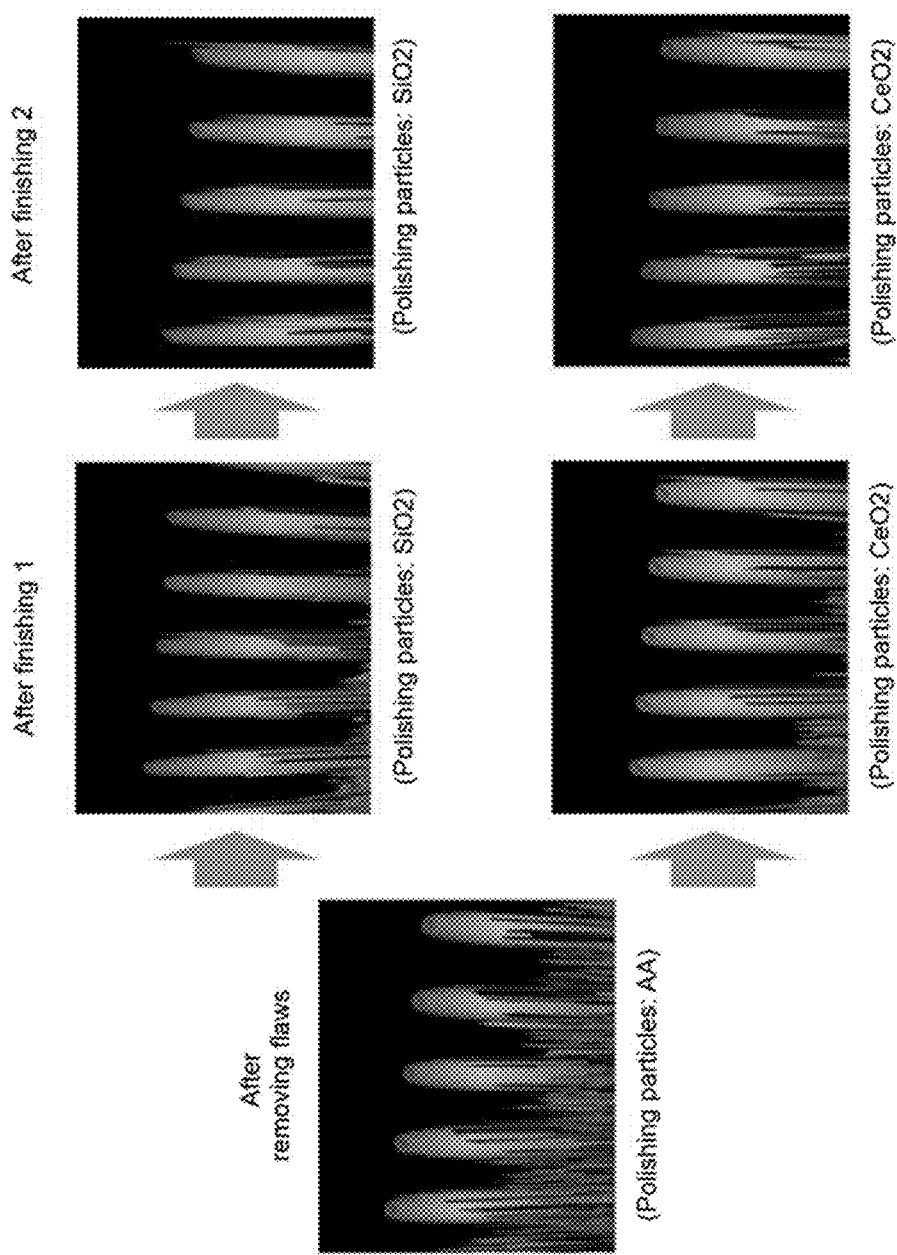
FIG. 6 shows 3D graphics of the shape of each optical fiber tip after each polishing process.

After each process, the projecting height of each optical fiber and the depth of the core dip of each optical fiber were measured using an end face shape measuring device (SMX-8 QM-B: manufactured by SUMIX) (FIG. 6). Based on the IEC 61755-3 standard, the depth of the core dip was determined by measuring the length of a straight line which was drawn vertically from a reference line, which is a straight line passing through the ridgeline of the recess of the core in the fiber tip, to the deepest part of the recess of the core.

The measurement results using the polishing sheet of the comparative example are shown in Table 2 below.

TABLE 2

| Process | Fiber projecting height (nm) | Core dip depth (nm) |
|---|---|---|
| After polishing for protruding | About 2100 to 2200 | About 15 to 40 |
| After polishing for removing flaws | About 1950 to 2100 | About 35 to 55 |
| Comparative example: After finish polishing 1 | About 1700 to 1800 | About 55 to 70 |
| Comparative example: After finish polishing 2 | About 1600 to 1700 | About 85 to 100 |

The measurement results using the polishing sheet of the example are shown in Table 3 below.

TABLE 3

| Process | Fiber projecting height (nm) | Core dip depth (nm) |
|---|---|---|
| After polishing for protruding | About 2100 to 2200 | About 15 to 40 |
| After polishing for removing flaws | About 1950 to 2100 | About 35 to 55 |
| Example: After finish polishing 1 | About 1800 to 1950 | About 20 to 50 |
| Example: After finish polishing 2 | About 1750 to 1900 | About 5 to 20 |

As shown in Tables 2 and 3 and FIG. 6, the end face of the MM fiber formed by the finish polishing using the polishing sheet of the example had a reduced depth of the core dip as compared to that after polishing using the polishing sheet having aluminum oxide polishing particles. The average depth of the core dips of the twelve optical fibers was about 36 nm after the first finish polishing process and about 11 nm (the shallowest is about 4 nm) after the second finish polishing process. Generally, after the first finish polishing process, the depth of the core dip was reduced as compared to that after the scratch removal polishing process, and after the second finish polishing process, the depth of the core dip was reduced as compared to that after the polishing for protruding process.

In the finish polishing using the cerium oxide flocked sheet of the comparative example, the depth of the core dip was increased as compared to that in the previous process and the depth was further increased in the second finish polishing. The average depth of the core dips of the twelve optical fibers was about 62 nm after the first finish polishing process and about 92 nm (the deepest was about 97 nm) after the second finish polishing process.

The present invention is not limited to the above embodiment, and various design changes can be made depending on the application without departing from the spirit and scope of the invention.

REFERENCE NUMERALS

11 Ferrule
20 Optical fiber
101 Optical fiber ferrule assembly 1
102 Optical fiber ferrule assembly 2
103 Optical fiber ferrule assembly 3
104 Optical fiber ferrule assembly 4

The invention claimed is:

1. A method of manufacturing an optical fiber connector having optical fibers attached to a ferrule comprising:
    flat surface polishing for polishing an end face of an optical fiber ferrule assembly into a flat surface;
    protruding optical fibers to predetermined heights from the end face of the ferrule by preferentially polishing the end face of the ferrule of the optical fiber ferrule assembly formed by the flat surface polishing, resulting in optical fibers having recesses with an average depth d1 at their tip cores;
    polishing for reducing flaws at end portions of the optical fibers of the optical fiber ferrule assembly formed by the protruding, resulting in optical fibers having recesses with an average depth d2 at their tip cores;
    polishing to finish the optical fiber ferrule assembly formed by the polishing for reducing flaws;
    wherein the polishing to finish is performed by moving the optical fiber ferrule assembly and a flocked polishing sheet relative to each other while the optical fiber ferrule assembly and the flocked polishing sheet are disposed opposite to each other and while the optical fibers having the core recesses are inserted into a flocked portion of the flocked polishing sheet, the fibers which constitute the flocked portion having silica particles attached to the surfaces of the fibers so as to reduce an average depth of the recesses to be lower than the average depth d1 and/or d2 in the polishing to finish, the silica particles having an average particle diameter in the range of 0.01 µm to 0.1 µm.

2. A method of manufacturing an optical fiber connector as set forth in claim 1,
    wherein, after first polishing to finish, the average depth of recesses is reduced as compared to that after polishing for reducing flaws, and after second polishing to finish, the average depth of recesses is reduced as compared to that after the protruding.

3. A method of manufacturing an optical fiber connector as set forth in claim 2,
    wherein, in the polishing for reducing flaws, optical fibers formed by the protruding are polished using a polishing material with aluminum oxide particles having an average particle diameter of 1 µm.

4. A method of manufacturing an optical fiber connector as set forth in claim 1,
    wherein the optical fiber connector is a multiple multimode fiber connector in which a plurality of multimode fibers are attached to the ferrule.

5. A method of manufacturing an optical fiber connector as set forth in claim 1,
    wherein, after the polishing to finish, the depth of the recess at the tip core of the optical fiber is 20 nm or less.

6. A method of polishing an optical fiber ferrule assembly, comprising:
    flat surface polishing for polishing an end face of an optical fiber ferrule assembly into a flat surface;
    protruding optical fibers to predetermined heights from the end face of the ferrule by preferentially polishing the end face of the ferrule of the optical fiber ferrule assembly formed by the flat surface polishing, resulting in optical fibers having recesses with an average depth d1 at their tip cores;
    polishing for reducing flaws at end portions of the optical fibers of the optical fiber ferrule assembly formed by the protruding, resulting in optical fibers having recesses with an average depth d2 at their tip cores;
    polishing to finish an optical fiber ferrule assembly formed by the polishing for reducing flaws;
    wherein the polishing to finish is performed by moving the optical fiber ferrule assembly and a flocked polishing sheet relative to each other while the optical fiber ferrule assembly and the flocked polishing sheet are disposed opposite to each other and while the optical fibers having the core recesses are inserted into a flocked portion of the flocked polishing sheet;
    wherein the fibers which constitute the flocked portion have silica particles attached to the surfaces of the fibers, so as to reduce average depth of the recesses to be lower than the average depth d1 and/or d2 in the polishing to finish, the silica particles having an average particle diameter in the range of 0.01 µm to 0.1 µm.

* * * * *